(12) United States Patent  
Gillespie (10) Patent No.: US 7,711,758 B1  
(45) Date of Patent: May 4, 2010

(54) METHOD, APPARATUS, AND COMPUTER-READABLE MEDIUM FOR STORING CHARACTER STRINGS IN A HUMAN INTERFACE INFRASTRUCTURE DATABASE

(75) Inventor: Kurt Gillespie, Lawrenceville, GA (US)

(73) Assignee: American Megatrends, Inc., Norcross, GA (US)

( * ) Notice: Subject to any disclaimer, the term of this patent is extended or adjusted under 35 U.S.C. 154(b) by 227 days.

(21) Appl. No.: 11/398,993

(22) Filed: Apr. 6, 2006

(51) Int. Cl.
*G06F 7/00* (2006.01)

(52) U.S. Cl. .................. 707/812; 707/690; 709/201; 709/202; 709/206

(58) Field of Classification Search ......... 709/201–206; 707/1–206
See application file for complete search history.

(56) References Cited

U.S. PATENT DOCUMENTS

| | | | |
|---|---|---|---|
| 7,113,947 B2* | 9/2006 | Benson et al. ............... 707/10 |
| 2003/0069890 A1* | 4/2003 | Benson et al. .......... 707/103 R |
| 2004/0109017 A1* | 6/2004 | Rothman et al. ........... 345/735 |
| 2004/0123090 A1* | 6/2004 | Zimmer et al. ................ 713/1 |
| 2005/0065987 A1* | 3/2005 | Telkowski et al. ........... 707/204 |
| 2006/0075020 A1* | 4/2006 | Seliger et al. ............... 709/203 |
| 2007/0150441 A1* | 6/2007 | Morris .......................... 707/3 |

OTHER PUBLICATIONS

Intel Intel Platofrm Innovation Framework for EFI Human Interface Infrastructure Specification. Draft for Review. Version 0.91 Apr. 1, 2004.*

* cited by examiner

*Primary Examiner*—Don Wong
*Assistant Examiner*—Tuan-Khanh Phan
(74) *Attorney, Agent, or Firm*—Hope Baldauff Hartman LLC (57) ABSTRACT

Methods, apparatuses, and computer-readable media for storing a character string in a HII database in an EFI environment are provided. According to one method, a request is received to store a character string in an HII database within an EFI environment. Included in the request are one or more attributes that distinctly identify the character string to be created and added to the HII database. A determination is then made as to whether a character string having identical or nearly identical distinct attributes was previously stored in the HII database. If a character string having identical distinct attributes was previously stored in the HII database, the character string is not stored in the HII database and the previously stored string's unique token is retrieved. If a character string having distinct attributes was not previously stored in the HII database, then the character string is stored in the HII database and a new unique token for the string is retrieved.

4 Claims, 8 Drawing Sheets

METHOD, APPARATUS, AND COMPUTER-READABLE MEDIUM FOR STORING CHARACTER STRINGS IN A HUMAN INTERFACE INFRASTRUCTURE DATABASE

BACKGROUND

In most computing systems, low level instruction code is used as an intermediary between the hardware components of the computing system and the operating software and other high level software executing on the computing system. In some computer systems, this low level instruction code is known as the Basic Input and Output System ("BIOS"). The BIOS provides a set of software routines that allow high level software to interact with the hardware components of the computing system using standard calls.

Because of limitations of the BIOS in many PC-compatible computers, a new specification for creating the firmware that is responsible for booting the computer and for intermediating the communication between the operating system and the hardware has been created. The new specification is called the Extensible Firmware Interface ("EFI") specification and is available from INTEL CORPORATION. The original EFI specification from INTEL CORPORATION is also being extended by the Unified Extensible Firmware Interface Forum ("UEFI").

The EFI specification describes an interface between the operating system and the system firmware. In particular, the specifications defines the interface that platform firmware must implement and the interface that the operating system may use in booting. How the firmware implements the interface is left up to the manufacturer of the firmware. The EFI specification provides protocols for EFI drivers to communicate with each other, and the EFI core provides functions such as allocation of memory, creating events, setting the clock, and many others. This is accomplished through a formal and complete abstract specification of the software-visible interface presented to the operating system by the platform and the firmware.

In order to provide core functionality for providing user input and output in an EFI-based firmware, the EFI specification provides for a Human Interface Infrastructure ("HII") protocol. The HII protocol provides a central access point for a HII database that stores all of the forms, character strings, and fonts utilized by drivers executing within the EFI environment. For instance, the HII protocol provides functionality for registering packages (also referred to herein as "packs") containing forms, strings, and fonts, and for storing the contents of these packs in the HII database. The HII protocol also provides functions for retrieving information about the data contained in the HII database and the data itself. The HII protocol is specifically defined in the INTEL Platform Innovation Framework for EFI HII Specification, which is expressly incorporated herein by reference.

In order to add character strings to the HII database, a program must first build the string. Once the string is built, the program submits the string to the HII database. The character string is then stored by HII in the HII database. An integer token that uniquely identifies the string is also returned in response to the submission of the character string to the HII database. The token may be later used to reference the character string in the HII database.

In general, character strings may be built, submitted to the HII database, assigned a unique token by the HII protocol, and stored in the HII database, even though an identical character string has been previously submitted and stored in the HII database. In the event that these operations are performed for a character string that is identical to a string that has been previously stored in the HII database, these operations unnecessarily utilize processing capacity and a portion of the limited storage space of the HII database. It is with respect to these considerations and others that the various embodiments of the invention have been made.

SUMMARY

In accordance with the present invention, the above and other problems are solved by methods, apparatuses, and computer-readable media for storing a character string in a HII database in an EFI environment. According to aspects of the invention, processing time is saved and memory consumption is reduced for character strings that are identical or nearly identical to character strings that have been previously submitted to the HII database.

According to one aspect of the invention, a method is provided for storing a character string in an HII database. According to the method, a request is received to store a character string in an HII database within an EFI environment. In the request, one or more attributes that distinctly identify the character string that would result from this request are provided. A determination is then made as to whether a character string having identical distinct attributes was previously stored in the HII database. If a character string having identical distinct attributes was previously stored in the HII database, the character string is not stored in the HII database again. Rather, the unique token provided by the HII database when the previous character string was stored is utilized to display the character string.

If a character string having identical distinct attributes was not previously stored in the HII database, then the character string is stored in the HII database. In particular, this includes submitting the character string to the HII database, receiving a token uniquely identifying the character string from the HII database in response to the submission, and storing the token and the distinct attributes for the character string in a table for use during subsequent lookup operations.

According to aspects of the method, a lookup table may be utilized to store the distinct attributes and the token for a character string the first time the character string is added to the HII database. During attempts to add a character string to the HII database, the lookup table is consulted to determine if the character string was previously added to the HII database. If so, the token for the character string is retrieved from the lookup table and utilized rather than creating a new string and receiving a new token from the HII database. Otherwise, the character string is submitted to the HII database and the returned token is stored in the lookup table along with the distinct attributes. In this manner, a character string is only added to the HII database once. On subsequent attempts the token for the string is retrieved from the lookup table rather than from the HII database.

According to other aspects of the method, the character strings may comprise an event log entry created by an event logger program. The event logger program monitors various aspects of the operation and performance of a computer system and creates entries in an event log when certain predefined events occur. A setup program provided by the computer may be utilized to view the event log entries. It should be appreciated, however, that the embodiments of the invention may be utilized with any character strings that are to be displayed within in EFI operating environment.

Aspects of the invention may also be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION

Embodiments of the present invention provide methods, systems, apparatuses, and computer-readable media for storing character strings in an HII database in an EFI environment. In the following detailed description, references are made to the accompanying drawings that form a part hereof, and in which are shown by way of illustration specific embodiments or examples. Referring now to the drawings, in which like numerals represent like elements throughout the several figures, aspects of the present invention and the exemplary operating environment will be described.

Figure 1:
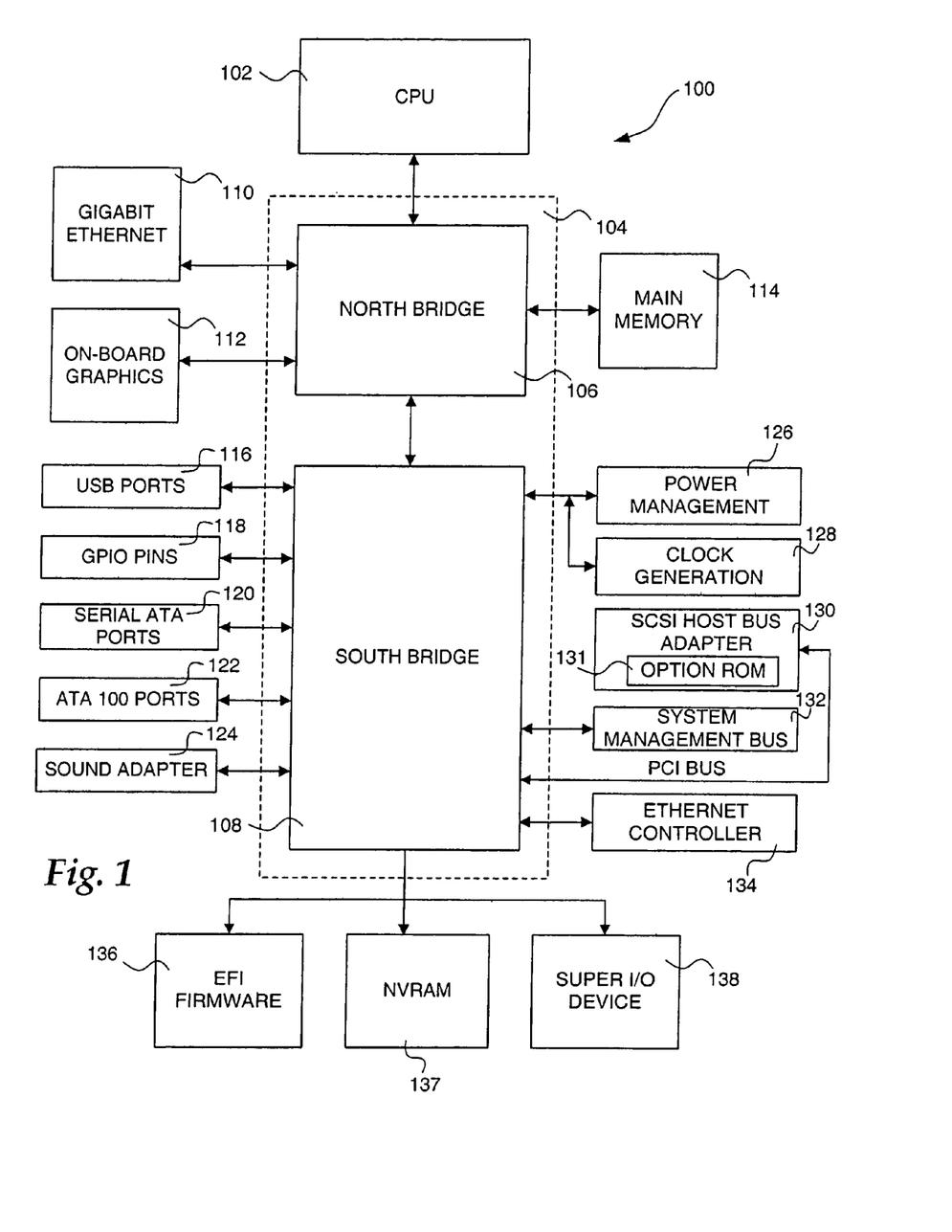
FIG. 1 is a computer architecture diagram that illustrates various components of a computer that provides an illustrative operating environment.

FIG. 1 and the following discussion are intended to provide a brief, general description of a suitable computing environment in which the invention may be implemented. While the invention will be described in the general context of program modules that execute in conjunction with the execution of a computer firmware, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for practicing the embodiments of the present invention will be described. It should be appreciated that although the embodiments of the invention described herein are discussed in the context of a conventional desktop or server computer, the embodiments of the invention may be utilized with virtually any type of computing device. FIG. 1 shows an illustrative computer architecture for a computer 100 that utilizes an EFI-compatible firmware.

In order to provide the functionality described herein, the computer 100 includes a baseboard, or "motherboard", which is a printed circuit board to which a multitude of components or devices may be connected by way of a system bus or other electrical communication path. In one illustrative embodiment, a central processing unit ("CPU") 102 operates in conjunction with a chipset 104. The CPU 102 is a standard central processor that performs arithmetic and logical operations necessary for the operation of the computer.

The chipset 104 includes a north bridge 106 and a south bridge 108. The north bridge 106 provides an interface between the CPU 102 and the remainder of the computer 100. The north bridge 106 also provides an interface to a random access memory ("RAM") used as the main memory 114 in the computer 100 and, possibly, to an on-board graphics adapter 112. The north bridge 106 may also include functionality for providing networking functionality through a gigabit Ethernet adapter 110. The gigabit Ethernet adapter 110 is capable of connecting the computer 100 to another computer via a network. Connections which may be made by the network adapter 110 may include local area network ("LAN") or wide area network ("WAN") connections. LAN and WAN networking environments are commonplace in offices, enterprise-wide computer networks, intranets, and the Internet. The north bridge 106 is connected to the south bridge 108.

The south bridge 108 is responsible for controlling many of the input/output functions of the computer 100. In particular, the south bridge 108 may provide one or more universal serial bus ("USB") ports 116, a sound adapter 124, an Ethernet controller 134, and one or more general purpose input/output ("GPIO") pins 118. The south bridge 108 may also provide a bus for interfacing peripheral card devices such as a BIOS boot system compliant SCSI host bus adapter 130, which includes an option ROM 131. In one embodiment, the bus comprises a peripheral component interconnect ("PCI") bus. The south bridge 108 may also provide a system management bus 132 for use in managing the various components of the computer 100. Power management circuitry 126 and clock generation circuitry 128 may also be utilized during the operation of the south bridge 108.

The south bridge 108 is also operative to provide one or more interfaces for connecting mass storage devices to the computer 100. For instance, according to an embodiment, the south bridge 108 includes a serial advanced technology attachment ("SATA") adapter for providing one or more serial ATA ports 120 and an ATA 100 adapter for providing one or more ATA 100 ports 122. The serial ATA ports 120 and the ATA 100 ports 122 may be, in turn, connected to one or more mass storage devices storing an operating system and application programs. As known to those skilled in the art, an operating system comprises a set of programs that control operations of a computer and allocation of resources. An application program is software that runs on top of the operating system software and uses computer resources made available through the operating system to perform application specific tasks desired by the user.

The mass storage devices connected to the south bridge 108 and the SCSI host bus adapter 130, and their associated computer-readable media, provide non-volatile storage for the computer 100. Although the description of computer-readable media contained herein refers to a mass storage device, such as a hard disk or CD-ROM drive, it should be appreciated by those skilled in the art that computer-readable media can be any available media that can be accessed by the computer 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 108 for connecting a "Super I/O" device 138. The Super I/O device 138 is responsible for providing a number of input/output ports, including a keyboard port, a mouse port, a serial interface, a parallel port, and other types of input/output ports. The LPC interface may also connect a computer storage media such as a ROM or a flash memory such as a non-volatile random access memory ("NVRAM") for storing the firmware 136 that includes program code containing the basic routines that help to start up the computer 100 and to transfer information between elements within the computer 100. The EFI firmware 136 comprises a firmware that is compatible with the EFI specification. Additional details regarding the operation of the EFI firmware 136 are provided below with respect to FIGS. 2-3. The LPC interface may also be utilized to connect a NVRAM 137 to the computer 100. It should be appreciated that the EFI firmware 136 may also be stored in the NVRAM 137.

According to embodiments of the invention, the EFI firmware 136 is also operative to provide a setup utility program. The setup utility program provides functionality for allowing a user to modify configuration settings of the computer 100. The configuration settings 100 may then be stored in the NVRAM 137 for use by the computer 100. In an embodiment of the present invention, the firmware 136 also includes an event logger program. The event logger program identifies events that have occurred within the computer 100 and stores data regarding these events in an event log in the NVRAM 137. The setup utility program provides an interface for viewing event log entries contained in the event log. Additional details regarding the event logger program, the event log, the setup utility program, and the methods utilized to display the event log data through a HII provided by the EFI firmware 136 will be provided below with respect to FIGS. 2-8B.

It should be appreciated that the computer 100 may comprise other types of computing devices, including hand-held computers, embedded computer systems, personal digital assistants, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

Figure 2:
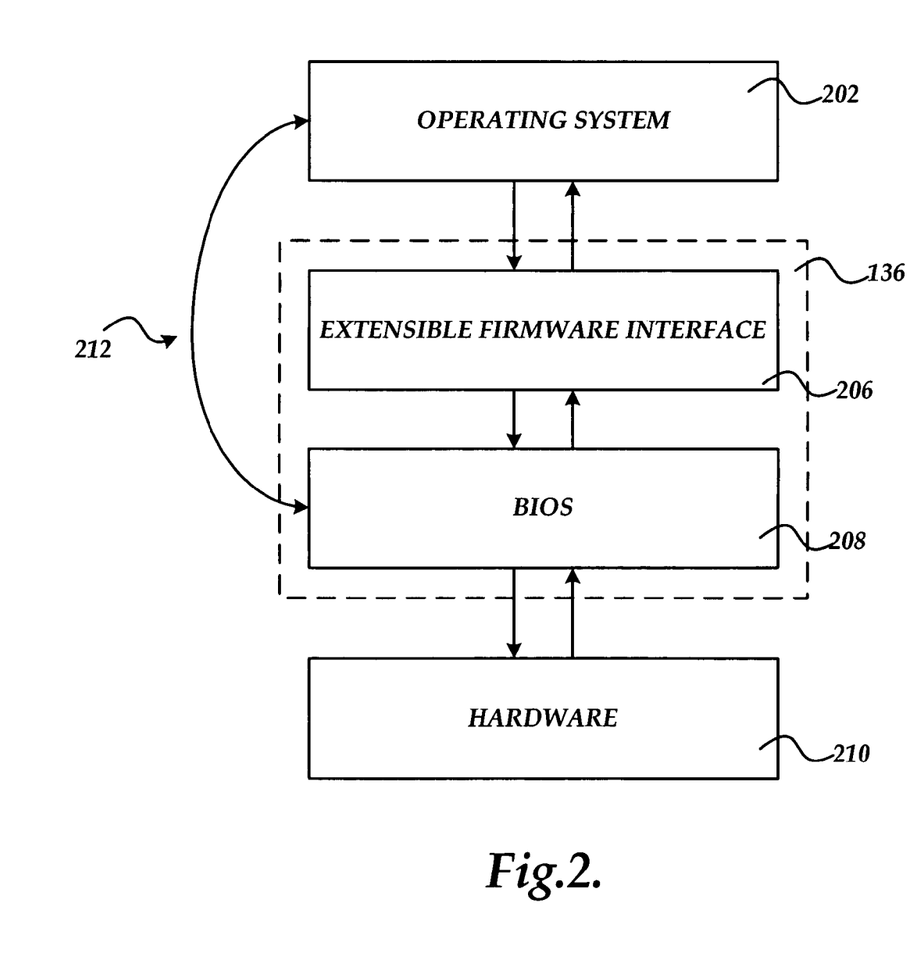
FIGS. 2 and 3 are computer architecture diagrams that illustrate aspects of an EFI environment utilized by the embodiments of the invention.

Referring now to FIG. 2, additional details regarding the operation of the EFI firmware 136 of the computer 2 will be described. As described above, the firmware 136 comprises a firmware compatible with the EFI specification from INTEL CORPORATION or from the UEFI FORUM. The EFI specification describes an interface between the operating system 202 and the system firmware 136. The EFI specification defines the interface that platform firmware must implement, and the interface that the operating system 202 may use in booting. How the firmware 136 implements the interface is left up to the manufacturer of the firmware. The intent of the specification is to define a way for the operating system 202 and firmware 136 to communicate only information necessary to support the operating system boot process. This is accomplished through a formal and complete abstract specification of the software-visible interface presented to the operating system by the platform and the firmware.

According to one implementation of EFI on INTEL CORPORATION IA-32 platforms, both the EFI 206 and a BIOS 208 may be present in the firmware 136. This allows users and system integrators to support both firmware interfaces. In order to provide this functionality, an interface 212 may be provided for use by legacy operating systems and applications. Additional details regarding the architecture and operation of the EFI 204 are provided below with respect to FIG. 3. Moreover, additional details regarding the operation and architecture of EFI can be found in the EFI specification which is available from INTEL CORPORATION end expressly incorporated herein by reference. As will be described in greater detail below, the EFI specification also includes a Human Interface Infrastructure specification. This specification is also expressly incorporated herein by reference.

Figure 3:
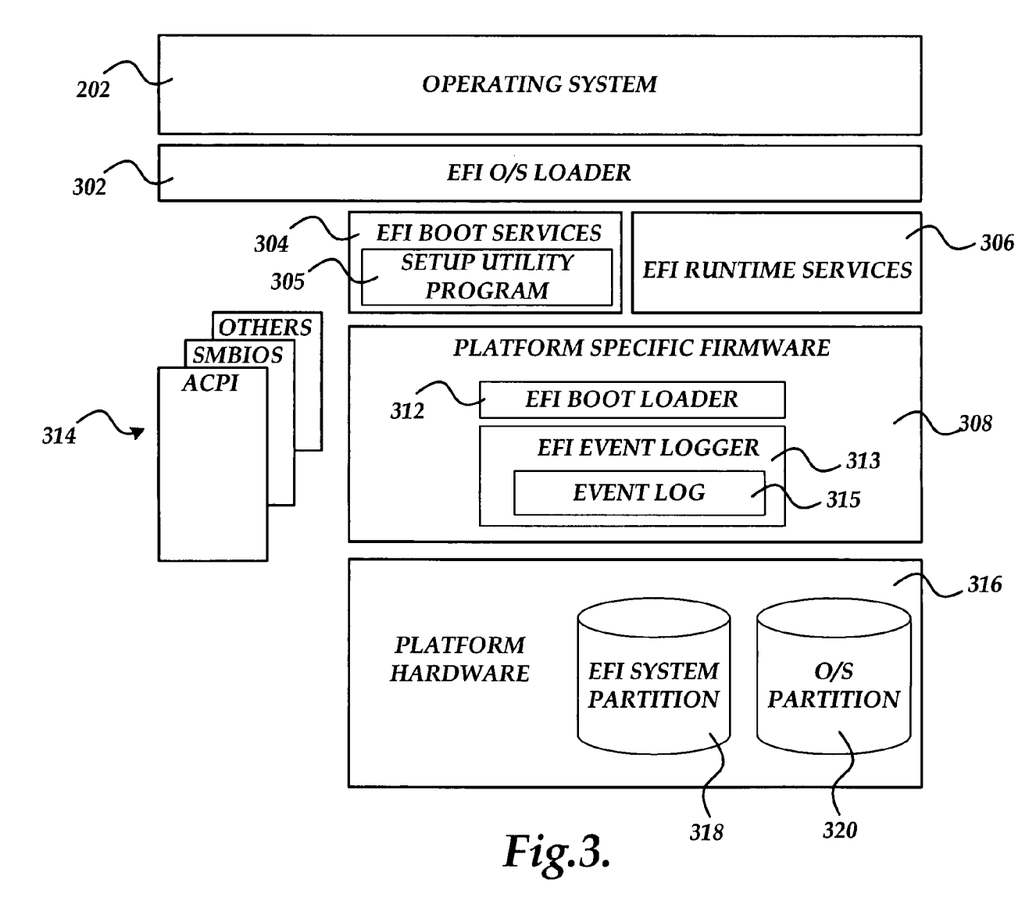

Turning now to FIG. 3, additional details regarding an EFI specification-compliant system utilized to provide an operating environment for the various embodiments of the invention will be described. As shown in FIG. 3, the system includes platform hardware 316 and an operating system 202. The platform firmware 308 may retrieve an OS image from the EFI system partition 318 using an EFI O/S loader 302. The EFI system partition 318 may be an architecturally shareable system partition. As such, the EFI system partition 318 defines a partition and file system that are designed to allow safe sharing of mass storage between multiple vendors. An O/S partition 320 may also be utilized.

Once started, the EFI O/S loader 302 continues to boot the complete operating system 202. In doing so, the EFI O/S loader 302 may use EFI boot services 304 and interface to other supported specifications to survey, comprehend, and initialize the various platform components and the operating system software that manages them. Thus, interfaces 314 from other specifications may also be present on the system. For example, the Advanced Configuration and Power Management Interface ("ACPI") and the System Management BIOS ("SMBIOS") specifications may be supported.

EFI boot services 304 provides interfaces for devices and system functionality that can be used during boot time. EFI runtime services 306 may also be available to the O/S loader 302 during the boot phase. For example, a minimal set of runtime services may be presented to ensure appropriate abstraction of base platform hardware resources that may be needed by the operating system 202 during its normal operation. EFI allows extension of platform firmware by loading EFI driver and EFI application images which, when loaded, have access to all EFI-defined runtime and boot services.

Various program modules provide the boot and runtime services. These program modules may be loaded by the EFI boot loader 312 at system boot time. The EFI boot loader 312 is a component in the EFI firmware that determines which program modules should be explicitly loaded and when. Once the EFI firmware is initialized, it passes control to the boot loader 312. The boot loader 312 is then responsible for determining which of the program modules to load and in what order.

Figure 8A:
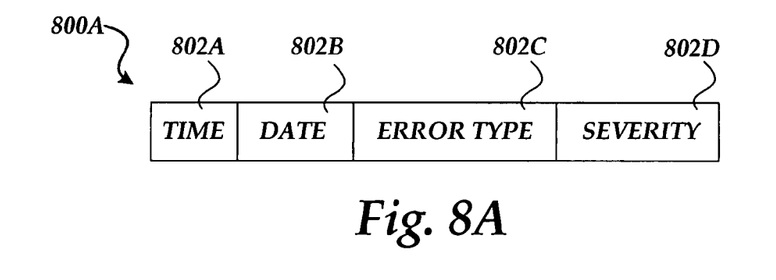
FIGS. 8A-8B are data structure diagrams illustrating aspects of several data structures utilized by the embodiments of the invention.

As discussed briefly above, according to one embodiment of the invention, the EFI firmware 136 is operative to provide an event logger program 313. The event logger 313 monitors the operation of the computer 100 and generates event log entries in an event log 315 when certain events occur. These events may be related to the performance, health, or other operational characteristics of the computer 100. The event log 315 may be stored in the main memory 114, the NVRAM 137, or both. As shown in FIG. 8A, an event log entry 800A includes the time 802A that an event occurred, the data 802B that an event occurred, the error type 802C for the event, and the severity 802D of the event. It should be appreciated that more or less data may be collected for each event identified by the event logger program 313 and stored in the event log 315, and that the fields illustrated in FIG. 8A are merely illustrative.

As also described briefly above, the EFI firmware 136 is operative to provide a setup utility program 305. Through the use of the setup utility program 305, users can modify configuration parameters for the computer 100. The setup utility program 305 is typically made available at power up of the computer 100. According to an embodiment of the invention, the setup utility program 305 also provides functionality for displaying the contents of the event log 315. In order to display character strings for events identified within the event log, the setup utility program must utilize functions provided by a HII protocol provided by the EFI firmware 136. The HII protocol provides internal data structures for storing information and providing access to input devices, forms, character strings, and fonts. Additional details regarding the structure and operation of the standard HII protocol are provided below with respect to FIG. 4.

Figure 4:
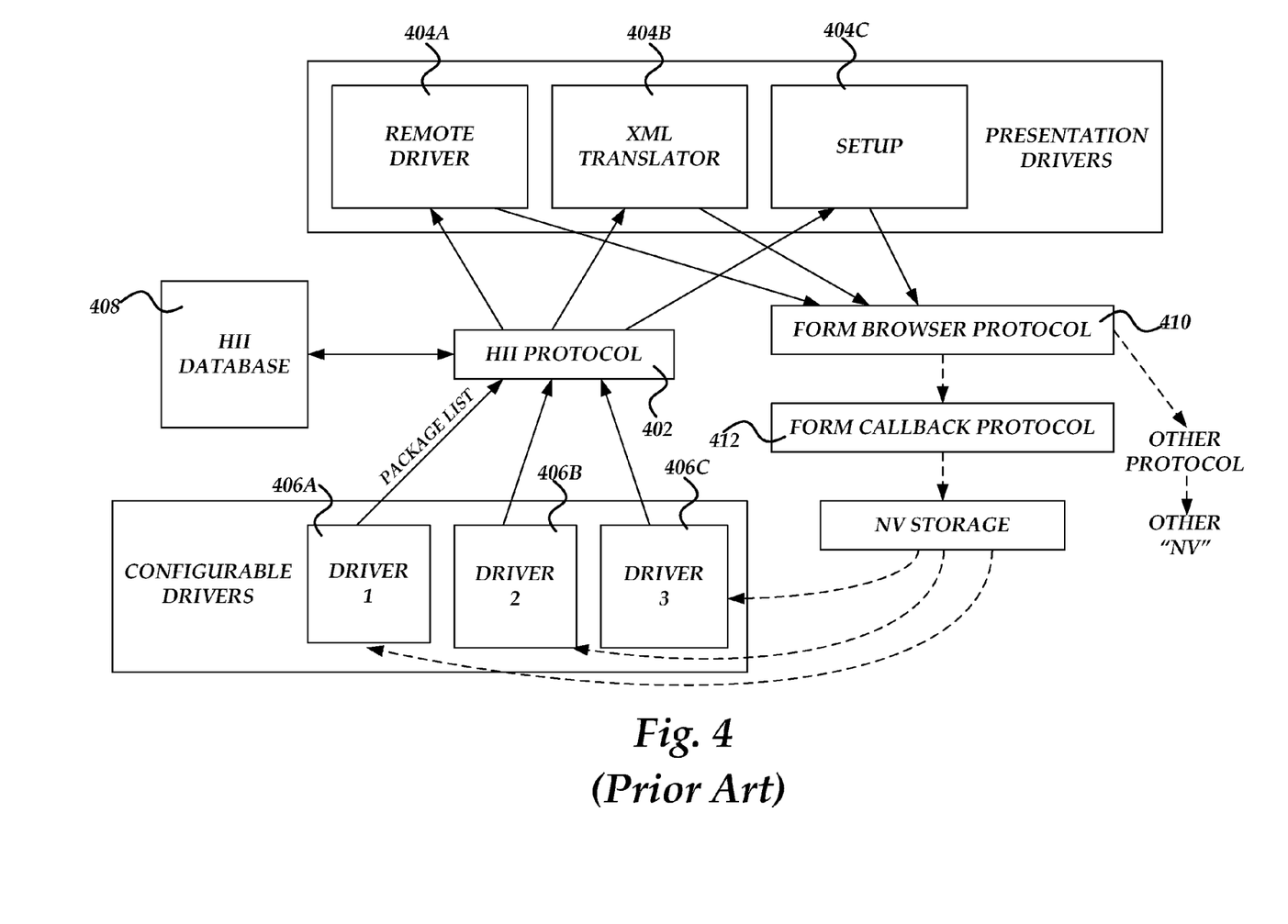
FIG. 4 is a block diagram depicting a model utilized within the EFI environment to manage human interface components.

Referring now to FIG. 4, an illustrative software model utilized inside the EFI framework to manage human interface components will be described. In particular, the software model shown in FIG. 4 is utilized to manage human interface data within an EFI environment. Human interface data may include fonts, character strings, and forms. Each of these is represented by a variable length data structure known as a package (or a "pack"). The INTEL Platform Innovation Framework for EFI HII Specification defines the format for the human interface data and the packages that contain them.

During boot up of a computer 100 based upon the EFI framework, it may be necessary to display different kinds of data and, hence, display of this data must be supported by the EFI firmware 136. For instance, it may be desirable to display graphical displays, text, query and response dialog boxes, and setup information during the boot process. The human interface data necessary to display this information is submitted to the HII protocol 402 for storage in the HII database 408 by drivers 406A-406C executing within the EFI preboot environment. In particular, packages are submitted to the HII protocol 402 to be stored in the HII database 408. Package lists may be submitted to the HII protocol 402 that identify different packages to be stored in the HII database 408. Different packages identified by the list are handed differently. Font packages are integrated into existing font data, thereby expanding the available font characters (also referred to herein as "glyphs"). Character string and form information is handled by assigning a handle to the "subdatabase." These handles are then used to refer to the strings by the drivers 406A-406C themselves, as well as other drivers, such as the presentation drivers 404A-404C, that make use of the information stored in the HII database 408.

A character string package defines a list of strings in a particular language or a related set of languages. Numerous character string packages may exist in a single package to implement support for multiple language sets. A character string is generally a C-style Unicode string, although it may contain special EFI-specific formatting characters as well. A character string is referred to by a character string token, which is a constant usually assigned when the character string is submitted to the HII database 408. Packages are also defined by EFI for storing forms and fonts. A form browser protocol 410 and a form callback protocol 412 are also defined by EFI for interacting with forms stored in the HII database 408.

Figure 5:
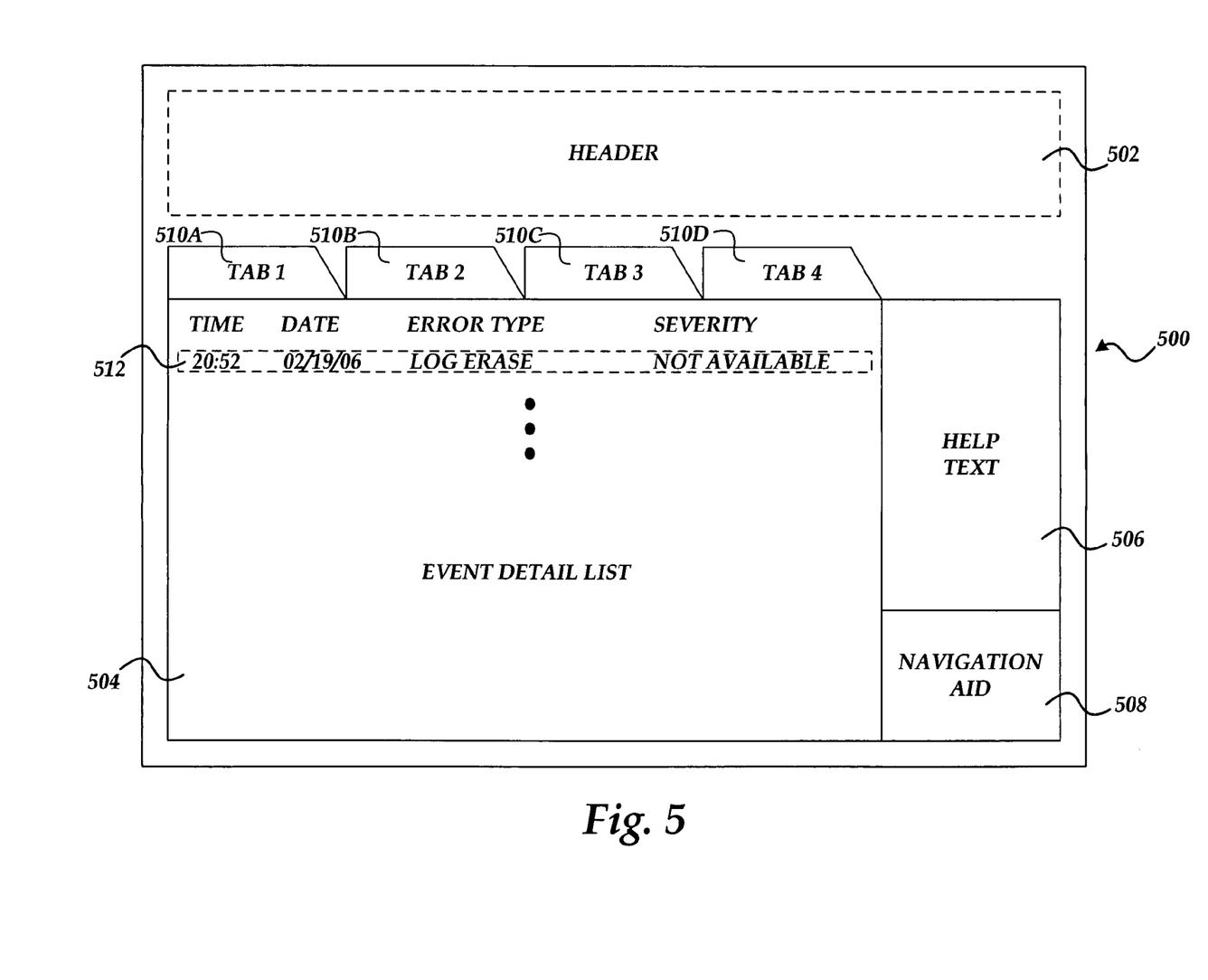
FIG. 5 is a screen diagram illustrating aspects of a setup utility program screen display for displaying the contents of an event log that is provided in embodiments of the invention.

Turning now to FIG. 5, additional details will be provided regarding an illustrative screen display 500 provided by the setup utility program 305 for viewing the contents of the event log 315. As shown in FIG. 5, the screen display 500 includes a header portion 502 for displaying a header for the currently displayed page. The screen display 500 also includes several tabs 510A-510D which may be selected by a user to change the currently displayed page. According to an embodiment, one of the tabs 510A-510D corresponds to a page for displaying the contents of the event log 315. In particular, an event detail portion 504 may be displayed that includes an event log entry 512 for each entry in the event log 315. Each event log entry 512 includes text corresponding to the time at which the event occurred, the date on which the event occurred, the error type for the event, and the severity of the event. According to an embodiment of the invention, the time, date, error type, and severity are combined to form a single character string that is submitted to the HII database 408 in the manner described below.

As also shown in FIG. 5, the screen display 500 includes a help text portion 506. The help text portion 506 is utilized to display additional help information regarding a selected event log entry 512. In order to display the help text, each unique event is assigned a character string for the help text. When a user selects an event log entry 512 in the event detail portion 504 of the screen display 500, the help text for the selected entry is identified and displayed. The screen display 500 also includes a navigation aid portion 508 for displaying information regarding how the screen display 500 is navigated.

As will be described in detail below, in order to display each event log entry 512, the help text 506, and any other character strings, it is necessary to first submit the character strings to the HII database 408. Once the character strings have been submitted to the HII database 408, and the tokens corresponding to the character strings have been obtained, the tokens can be inserted into the page and the page displayed. Additional details regarding this process are provided below with respect to FIG. 6.

Figure 6:
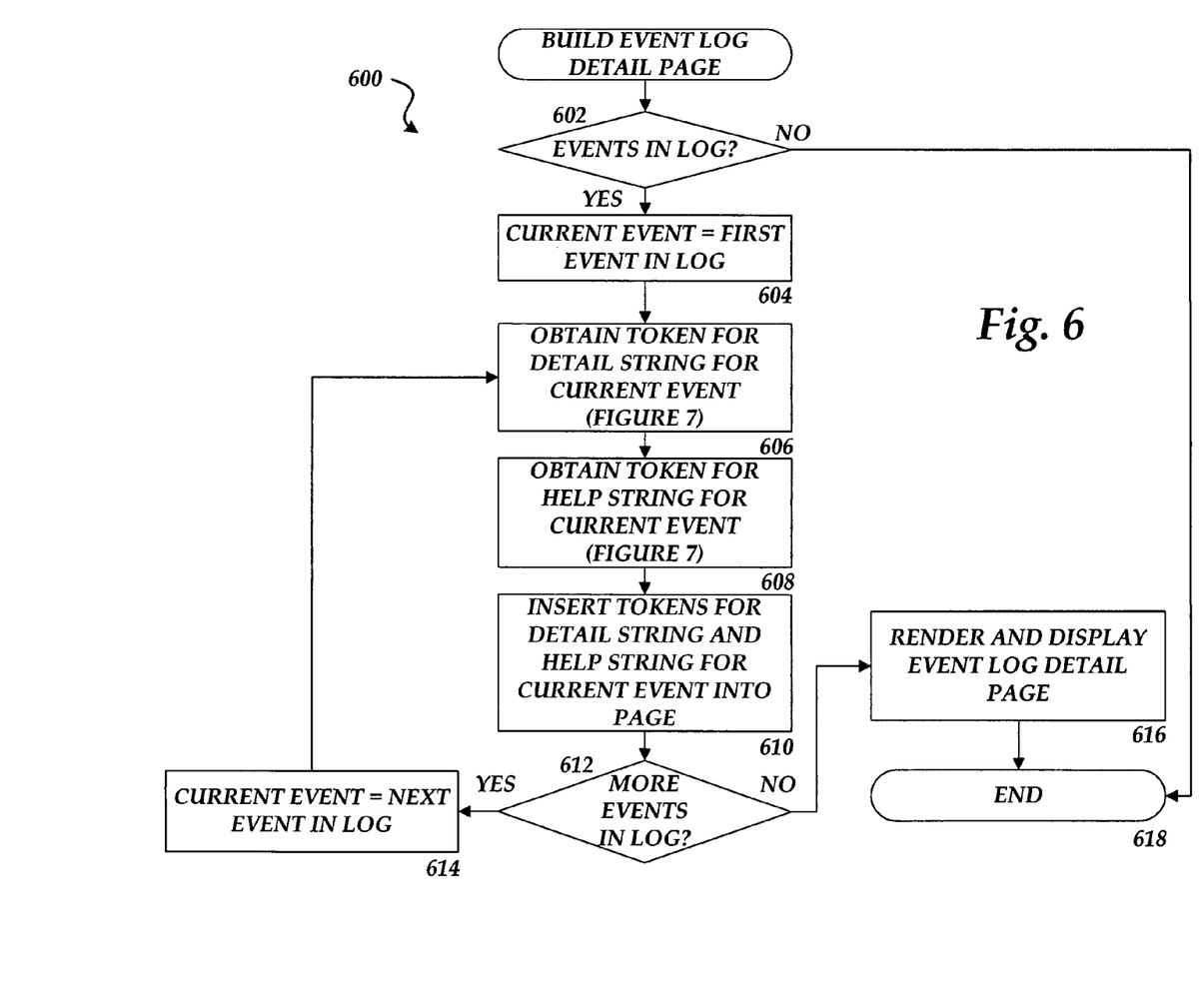
FIG. 6 is a flow diagram showing an illustrative process for building a display page according to one embodiment of the invention.

Referring now to FIG. 6, an illustrative routine 600 will be described in detail for building the event log detail list described above with respect to FIG. 5. The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 600 begins at operation 602, where a determination is first made as to whether there are any events identified in the event log 315. If no events are present in the event log 315, the routine 600 branches to operation 618 where it ends. If events are present in the event log 315, the routine 600 continues to operation 604. At operation 604, a temporary variable that identifies the current event being processed is set equal to the first event in the event log 315. The routine 600 then continues to operation 606, where a token is obtained for the character string corresponding to the current event log entry. An illustrative routine 700 for obtaining a token from the HII database 408 for a character string will be described below with reference to FIG. 7.

From operation 606, the routine 600 continues to operation 608, where a token is also obtained for the help text 506 corresponding to the current event log entry. The routine 700, described below, is also utilized to obtain the token from the HII database 408 for the help text. Once tokens have been obtained for the event log entry 512 and the corresponding help text 506, the routine 600 continues to operation 610.

At operation 610, the tokens for the current event log entry 512 and the corresponding help text 506 are inserted into the page. The routine 600 then continues to operation 612, where a determination is made as to whether there are additional events remaining in the event log to be inserted into the page. If additional events remain to be inserted into the page, the routine 600 branches from operation 612 to operation 614, where the variable utilized for storing the current event is set to the next event in the event log 315. The routine continues from operation 614 back to operation 606, where the tokens for the next event are obtained and inserted into the page.

If, at operation 612, it is determined that additional events do not exist in the event log 315, then the routine 600 branches from operation 612 to operation 616. At operation 616, the event log detail page is rendered as shown and described above with respect to FIG. 5. In order to render the page, the tokens inserted into the page are referenced against the HII database 408 to obtain the proper character string for display on the page. As discussed in greater detail below with reference to FIG. 7, a method is provided for ensuring that identical character strings are submitted to the HII database only one time. It should be appreciated that the routine illustrated and described with respect to FIG. 6 is performed each time the page is entered to ensure that the contents of the page contain the most up to the moment information from the event log 315, that may or may not contain records displayed previously.

Figure 7:
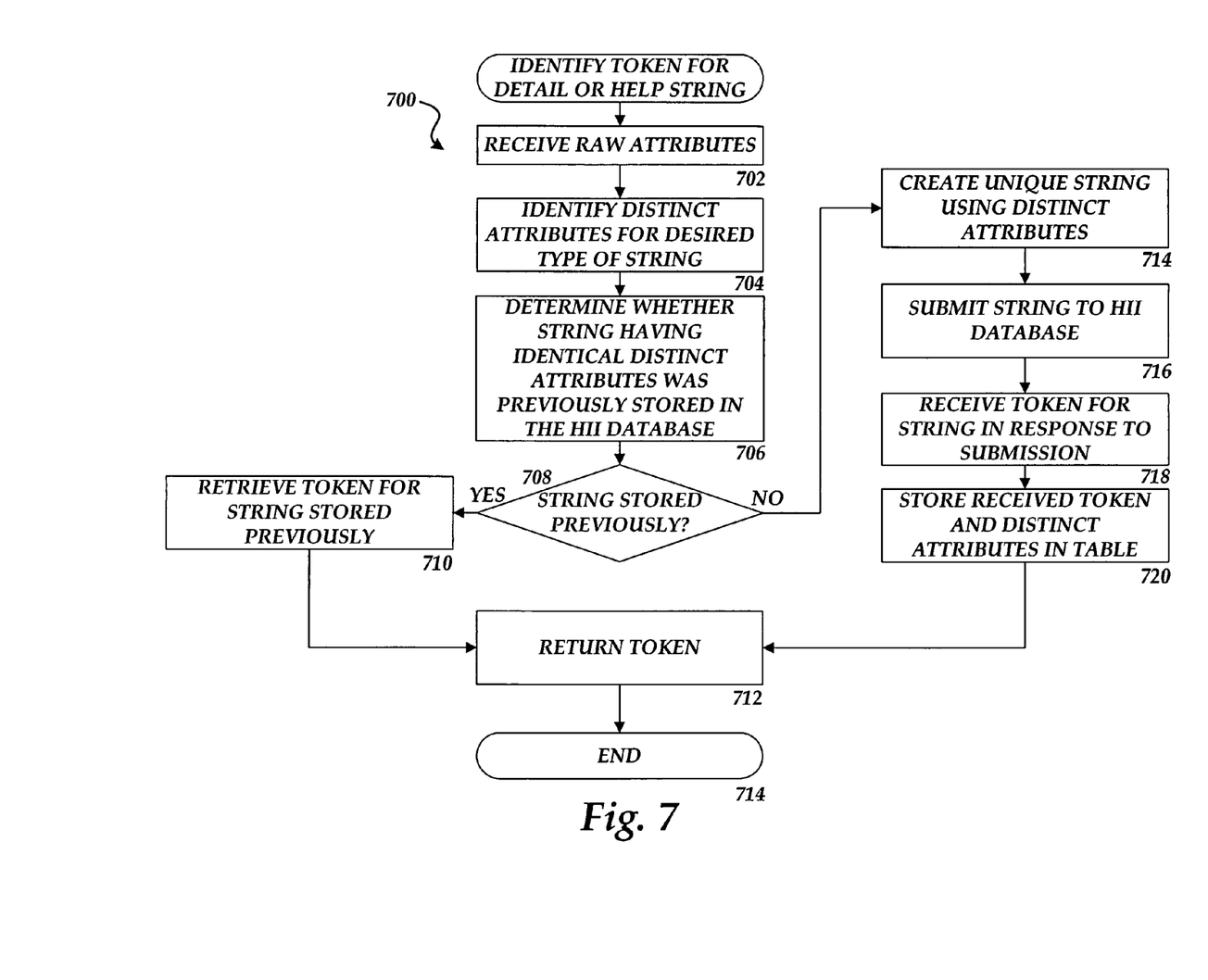
FIG. 7 is a flow diagram showing an illustrative process for identifying an HII token identifying a character string according to one embodiment of the invention.

Referring now to FIG. 7, an illustrative routine 700 will be described for obtaining a token for a character string for an event log entry 512 or the help text 506 according to one embodiment of the invention. The routine 700 begins at operation 702, where the all raw attributes that may be utilized to create either the detail string or the help string are received. The routine 700 then continues to operation 704, where one or more distinct attributes from the set of raw attributes are identified for creating the type of the character string desired. The distinct attributes are characteristics of the character string that uniquely identify it and are used to create it. For instance, in the embodiment described herein for displaying the contents of an event log, the distinct attributes may include a particular combination of time, date, error type, and severity. It should be appreciated that these are illustrative distinct attributes for an event log entry character string and that other types of character strings will include different distinct attributes. Once the distinct attributes have been identified, the routine 700 continues to operation 706.

Figure 8B:
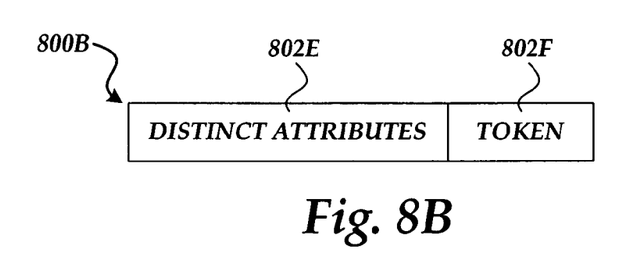

At operation 706, a determination is made as to whether a character string having unique attributes identical to the computed unique attributes for the current string was previously stored in the HII database 408. According to one embodiment, this is determined by consulting a lookup table that correlates unique attributes to tokens for one or more character strings. FIG. 8B shows an illustrative data structure for such a lookup table. As shown in FIG. 8B, the lookup table 800B contains an entry for each character string that has been previously stored in the HII database 408. Each entry includes a field 802E holding the computed unique attributes for the character string and a field 802F holding the token received from the HII database 408 for the character string. In this manner, a record is maintained of the unique attributes and the corresponding token for each character string that has been stored in the HII database 408.

If a character string having unique attributes identical to the computed unique attributes for the current string was previously stored in the HII database 408, the routine 700 branches from operation 708 to operation 710. At operation 710, the token for the current character string is retrieved from the lookup table 800B rather than from the HII database 408. Because a character string having identical unique attributes was previously stored in the HII database 408, there is no need to re-store the same character string. Rather, the token stored in the field 802F of the lookup table 800B may be utilized and inserted into the page. Once the token has been retrieved from the lookup table 800B, the routine 700 continues to operation 712, where the token is returned. The routine 700 then continues to operation 714, where it ends.

If, at operation 708, it is determined that a character string having unique attributes identical to the computed unique attributes for the current string was not previously stored in the HII database 408, the routine 700 branches from operation 708 to operation 714. At operation 714, a string is created from the character string for submission to the HII database 408. The string being created from the distinct attributes in operation 714 is highly dependant on the actual application being used, where in the example of the event log records the distinct attributes may be date and time in a hexadecimal format and the resulting string would be in the US date/time format of "12:00 AM Thursday, Jan. 1, 2000". Once the string has been created, the routine 700 continues to operation 716, where the string is submitted to the HII database 408. The string is then stored in the HII database 408 and a token is generated that uniquely identifies the string.

From operation 716, the routine 700 continues to operation 718 where the token is received in response to the submission of the character string to the HII database 408. The routine 700 then continues to operation 720, where the received token and the computed unique attributes for the string are stored in a new entry in the lookup table 800B. In this manner, any future instances of the same character string will utilize the token stored in the lookup table 800B rather than performing the steps required to store the string in the HII database 408. From operation 720, the routine 700 continues to operation 712, where the token is returned. The routine 700 then continues to operation 714, where it ends.

In view of the foregoing, it should also be appreciated that embodiments of the present invention provide methods, systems, apparatuses, and computer-readable media for storing strings in an HII database in an EFI environment. It should be appreciated that although the embodiments of the invention described herein are presented in the context of submitting event log character strings to an HII database, the aspects of the invention may be utilized when submitting any type of character string to the HII database. Moreover, it should also be appreciated that the aspects described herein may be utilized with any type of program, including an implementation within the HII protocol itself.

Although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

I claim:

1. A computer-implemented method for storing a character string in a human interface infrastructure (HII) database in an extensible firmware interface (EFI) environment, the method comprising computer-implemented operations for:
   receiving a request to store a character string in the HII database;
   receiving a plurality of distinct attributes in response to receiving the request to store the character string in the HII database, each of the plurality of distinct attributes corresponding to a portion of the character string;
   determining whether a previously-generated character string having identical distinct attributes to the character string was previously stored in the HII database;
   generating the character string based on the plurality of distinct attributes in response to determining that the previously-generated character string having identical distinct attributes was not previously stored in the HII database;
   storing the character string in the HII database in response to generating the character string; and
   not storing the character string in the HII database in response to determining that the previously-generated character string having identical distinct attributes was previously stored in the HII database, wherein
      determining whether a previously-generated character string having identical distinct attributes to the character string was previously stored in HII database comprises performing a lookup operation in a table that correlates distinct attributes for one or more character strings to HII tokens to determine whether the previously-generated character string was previously stored in the HII database,
      storing the character string in the HII database comprises submitting the character string to the HII database, receiving a token for the character string in response to the submission, and storing the token and the distinct attributes for the character string in the table,
      the character string comprises an event log entry, the event log entry comprising a time field specifying a time when an event occurs, a date field specifying a date when the event occurs, an error type field specifying an error type for the event, and a severity field specifying a severity of the event, and
      the distinct attributes specify a format for the time field and the date field.

2. The computer-implemented method of claim 1, wherein the event log entry is displayed by a setup utility program executing within the EFI environment.

3. A computer-implemented method for storing a character string in a human interface infrastructure (HII) database in an extensible firmware interface (EFI) environment, the method comprising computer-implemented operations for:
   receiving a request to display a character string on a page;
   in response to the request, receiving a plurality of distinct attributes, each of received distinct attributes corresponding to a portion of the character string;
   accessing a lookup table comprising a plurality of entries, each of the entries comprising a first field containing distinct attributes and a second field containing a previous token identifying a previously-generated character string in the HII database;
   determining from the lookup table whether a previously-generated character string having identical distinct attributes was previously stored in the HII database by searching the lookup table for an entry including the first field matching the received distinct attributes;
   in response to determining that a previously-generated character string having identical distinct attributes was not previously stored in the HII database, submitting the character string to the HII database, receiving a new token identifying the character string in the HII database in response to the submission, and saving the new token and the received distinct attributes for the character string in a new entry of the lookup table;
   in response to determining that a previously-generated character string having identical distinct attributes was previously stored in the HII database, retrieving the previous token from the lookup table corresponding to the received distinct attributes; and
   inserting the new token or the previous token for the character string into the page to thereby cause the character string to be retrieved from the HII database and displayed on the page, wherein
      the character string comprises an event log entry displayed by a setup utility program executing within the EFI environment, the event log entry comprising a time field specifying a time when an event occurs, a date field specifying a date when the event occurs, an error type field specifying an error type for the event, and a severity field specifying a severity of the event, and
      the distinct attributes specify a format for the time field and the date field.

4. A computer-implemented method for storing character strings in a human interface infrastructure (HII) database in an extensible firmware interface (EFI) environment, the method comprising computer-implemented operations for:
   receiving a request to store a character string in the HII database;
   in response to the request, receiving a plurality of raw attributes;
   identifying a plurality of distinct attributes from the plurality of raw attributes, each of the identified distinct attributes corresponding to a portion of the character string;
   accessing a lookup table comprising a plurality of entries, each of the entries comprising a first field containing distinct attributes and a second field containing a previous token identifying a previously-generated character string in the HII database;

searching the lookup table for an entry containing the first field matching the identified distinct attributes;

in response to locating an entry in the lookup table containing the first field matching the identified distinct attributes, retrieving from the second field of the entry the previous token that uniquely identifies the character string;

in response to not locating an entry in the table containing the distinct attributes, adding the character string to the HII database, generating a new token uniquely identifying the character string in the HII database, and storing the identified distinct attributes and the new token in the table; and using the new token or the previous token to display the character string on a display page, wherein the character string comprises an event log entry, the event log entry comprising a time field specifying a time when an event occurs, a date field specifying a date when the event occurs, an error type field specifying an error type for the event, and a severity field specifying a severity of the event, and the distinct attributes specify a format for the time field and the date field.

* * * * *